US011425892B1

(12) United States Patent
Bennett et al.

(10) Patent No.: US 11,425,892 B1
(45) Date of Patent: Aug. 30, 2022

(54) SYSTEMS, METHODS, AND USER INTERFACES FOR A DOMESTIC ANIMAL IDENTIFICATION SERVICE

(71) Applicant: Barel IP, Inc., Salt Lake City, UT (US)

(72) Inventors: Brian T. Bennett, Longboat Key, FL (US); Ava R. Slifko, Sarasota, FL (US)

(73) Assignee: Barel IP, Inc., Mississauga (CA)

( * ) Notice: Subject to any disclaimer, the term of this patent is extended or adjusted under 35 U.S.C. 154(b) by 0 days.

(21) Appl. No.: 17/668,883

(22) Filed: Feb. 10, 2022

Related U.S. Application Data

(60) Provisional application No. 63/234,569, filed on Aug. 18, 2021.

(51) Int. Cl.
*A01K 29/00* (2006.01)
*G06T 7/00* (2017.01)
(Continued)

(52) U.S. Cl.
CPC ........ *A01K 29/005* (2013.01); *G06F 16/2428* (2019.01); *G06F 16/24575* (2019.01);
(Continued)

(58) Field of Classification Search
CPC ....... G06T 7/90; G06T 7/0002; G06T 11/203; G06T 2200/24; G06F 3/048;
(Continued)

(56) References Cited

U.S. PATENT DOCUMENTS 7,870,840 B2 * 1/2011 Valencia ................ G06Q 50/02
119/840
9,104,906 B2 8/2015 McVey
(Continued)

FOREIGN PATENT DOCUMENTS

| AU | 2019253883 A1 | 5/2020 |
| KR | 20180070057 A | 6/2018 |
| WO | WO 2017/030448 A1 | 2/2017 |

OTHER PUBLICATIONS

Cordoba; "Where is my pet? A Global Solution for Locating Lost Pets;" [Thesis]; Universitat Politécnica de Catalunya; (Jun. 2020); 98 pages; Telecommunications Technologies and Services Engineering; Barcelona.

(Continued)

*Primary Examiner* — Wesner Sajous
(74) *Attorney, Agent, or Firm* — Thorpe North and Western LLP

(57) ABSTRACT

Technologies are described for a domestic animal identification service. In one example, domestic animal profiles can be dynamically displayed in a profile display region of a graphical user interface. Domestic animal profiles that correspond to one or more phenotypes can be obtained from a profile data store, and the domestic animal profiles can be displayed in a profile display region of the graphical user interface to allow user-identification of a profile that may be associated with the domestic animal. The profile display region of the graphical user interface can be dynamically updated to include domestic animal profiles that correspond to identification parameters input to the graphic user interface.

20 Claims, 12 Drawing Sheets

(51) Int. Cl.
*G06T 7/90* (2017.01)
*G06T 11/00* (2006.01)
*G06F 3/048* (2013.01)
*G06F 16/242* (2019.01)
*G06F 16/245* (2019.01)
*G09G 5/02* (2006.01)
*G06F 16/2457* (2019.01)
*G06T 11/20* (2006.01)

(52) U.S. Cl.
CPC .............. *G06T 7/0002* (2013.01); *G06T 7/90* (2017.01); *G06T 11/203* (2013.01); *G06T 2200/24* (2013.01)

(58) Field of Classification Search
CPC .......... G06F 16/2428; G06F 16/24575; A01K 29/005; A01K 11/004; A01K 11/008; A01K 11/006; G09G 5/02; G09G 2320/06; G09G 2320/0606; G09G 2320/0613; G09G 2320/066; G06K 9/6217
See application file for complete search history.

(56) References Cited

U.S. PATENT DOCUMENTS

| | | |
|---|---|---|
| 9,119,376 B2 | 9/2015 | Ng et al. |
| 9,323,783 B1 | 4/2016 | Mowry |
| 9,443,166 B2 | 9/2016 | Kinard |
| 9,839,197 B1 | 12/2017 | Samuel |
| 10,575,496 B2 | 3/2020 | Lasher et al. |
| 10,643,062 B2 | 5/2020 | Polimeno |
| 2007/0288249 A1 | 12/2007 | Rowe et al. |
| 2015/0131868 A1 | 5/2015 | Rooyakkers et al. |
| 2019/0053470 A1* | 2/2019 | Singh ................... A01K 11/004 |
| 2019/0380311 A1* | 12/2019 | Crouthamel ......... A01K 11/004 |
| 2020/0163311 A1 | 5/2020 | Kelly et al. |
| 2020/0267936 A1* | 8/2020 | Tran ..................... A01K 29/005 |
| 2021/0112781 A1* | 4/2021 | Crouthamel ......... A01K 29/005 |
| 2021/0212294 A1* | 7/2021 | Singh ................... A01K 11/004 |

OTHER PUBLICATIONS

Moreira et al.; "Where is My Puppy? Retrieving Lost Dogs by Facial Features;" dblp Computer Science Bibliography; (Aug. 1, 2016); 17 pages; <doi: 10.48550/arXiv.1510.02781 >.

* cited by examiner

FIG. 1C

⚠ Reported Missing

Basics

| | | | |
|---|---|---|---|
| Name | Species | Date of Birth | Sex |
| Casie Born | Dog | 08/03/2018 | Male |
| Size | | Age | Spayed/neutered |
| Medium: 15-25 lbs | | 3 Years | Yes |

Identification

Photos

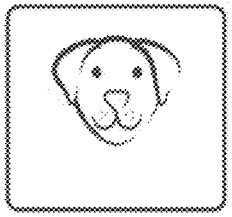

Markings

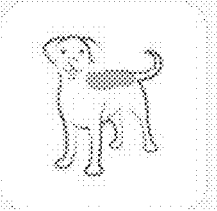

Breed
Dobermann

Eye Color
Brown

Coat Colors
Primary: Brown; Second: -; Third: -

Coat Pattern
-

Marking Location
Back

Marking Type
Bald Patch

Additional Markings
Lorem ipsum dolor sit amet, consectetuer adipiscing elit, sed diam nonummy nibh euismod tincidunt ut laoreet dolore magna aliquam.

Medical

Is your pet up to date on their rabies vaccination?
Yes

Date of Rabies Vaccination
08/03/2021

Any allergic reactions that required veterinary care?
No

Describe Allergic Reaction
-

FIG. 1D

SYSTEMS, METHODS, AND USER INTERFACES FOR A DOMESTIC ANIMAL IDENTIFICATION SERVICE

RELATED APPLICATION

This application claims priority to U.S. Provisional Application No. 63/234,569, filed Aug. 18, 2021 which is incorporated herein by reference.

BACKGROUND

A pet recovery service is a service for the specific purpose of reuniting lost or stolen pets with their owners. A wide variety of pet recovery services can be used to search for lost pets. Services for searching for lost pets may include use of a bloodhound, a pet detective, websites that offer advice, such as on how to conduct a search, or sites that offer a bulk-calling computer that can quickly alert hundreds of neighbors by phone. Forms of external identification include collar tags with identifying information, phone numbers, or quick response (QR) codes with the pet information or pet recovery service organization information. The pet can be tracked through a service toll-free number or web address on the tag. The service accesses the pet and owner information in a database via a number or QR code. Some pet identification tags include the owner's address or phone number that can be used to reunite the pet with its owner.

SUMMARY

Systems, methods, and user interfaces for a domestic animal identification service is disclosed. In one example, a method for displaying domestic animal profiles in a graphical user interface can include receiving input to the graphical user interface that includes at least an image of a domestic animal and a geographic location of the domestic animal. The method can analyze the image of the domestic animal using an phenotype extraction tool to identify one or more phenotypes of the domestic animal and obtain a set of domestic animal profiles from a profile data store that correspond to the geographic location and at least one phenotype of the domestic animal. The method can dynamically display the set of domestic animal profiles in a profile display region of the graphical user interface to allow user-identification of a domestic animal profile displayed in the profile display region that is associated with the domestic animal, wherein the profile display region of the graphical user interface is dynamically updated to include domestic animal profiles that correspond to identification parameters input to the graphic user interface In another example, a system for displaying domestic animal profiles in a graphical user interface can include a pet profile data store, at least one processor, and a memory device including instructions that, when executed by the at least one processor, cause the system to receive input to the graphical user interface that includes: at least one phenotype of the domestic animal, at least one image of the domestic animal, and a geographic location of the domestic animal. The system can analyze the image(s) using an phenotype extraction tool to determine an accuracy of the phenotype received as input to the graphical user interface, and the system can replace the phenotype with a corrected phenotype determined via analysis of the image of the domestic animal when it is determined that the accuracy of the phenotype input to the graphical user interface is low. The system can obtain domestic animal profiles from the profile data store that correspond to the geographic location and at least one phenotype of the domestic animal and dynamically display the domestic animal profiles in a profile display region of the graphical user interface to allow user-identification of a domestic animal profile displayed in the profile display region that is associated with the domestic animal, wherein the profile display region of the graphical user interface is dynamically updated to include domestic animal profiles that correspond to identification parameters input to the graphic user interface.

There has thus been outlined, rather broadly, the more important features of one or more embodiments so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

FIGS. 1A-D are diagrams illustrating examples of a graphical user interface for a pet identification service.

Figure 1A:
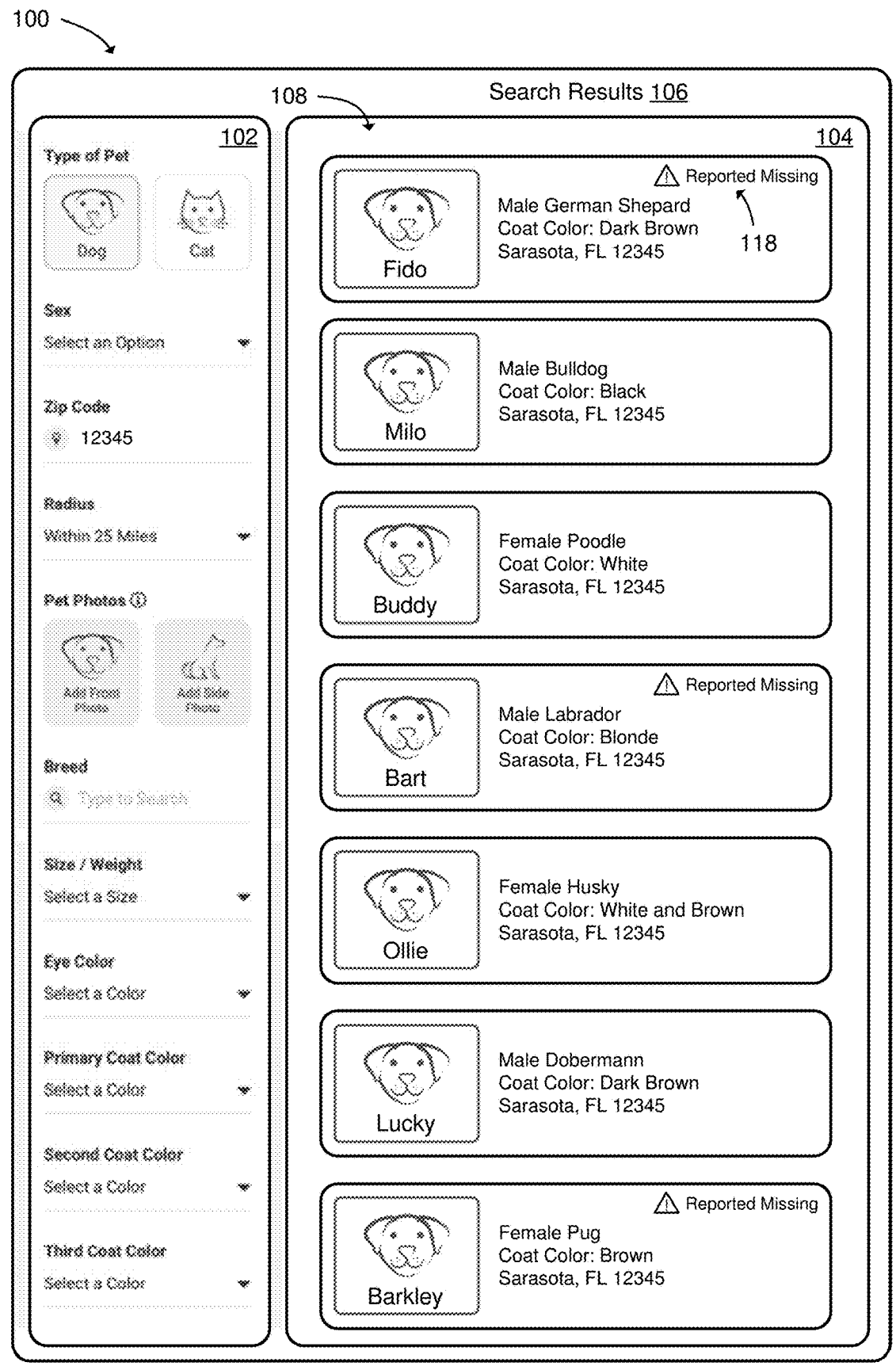

These drawings are provided to illustrate various aspects of the technology and are not intended to be limiting.

DETAILED DESCRIPTION

Before the present technology is disclosed and described, it is to be understood that this disclosure is not limited to the particular structures, process steps, or materials disclosed herein, but is extended to equivalents thereof as would be recognized by those ordinarily skilled in the relevant arts. While examples of the technology are described in sufficient detail to enable those skilled in the art to practice the invention, it should be understood that other embodiments may be realized and that various changes to the technology may be made without departing from the spirit and scope of the present technology. Thus, the following more detailed description of the technology is not intended to limit the scope of the technology, as claimed, but is presented for purposes of illustration only and not limitation to describe the features and characteristics of the present technology, to set forth the best mode of operation of the technology, and to sufficiently enable one skilled in the art to practice the technology. Accordingly, the scope of the present technology is to be defined solely by the appended claims.

Technologies are described for a domestic animal (e.g., pet) identification service comprising software applications, application programming interfaces (APIs), and a graphical user interface to obtain and display profiles for domestic animals to a user to enable the user to identify a profile associated with a found domestic animal. In particular, the technologies described herein can be implemented to match a lost pet with a profile of the pet that facilitates the return of the lost pet to a pet owner or caregiver. Additionally, the technologies described herein provide significant benefit to commercial animal management in identifying singular animals amongst large groups.

The technologies may allow a user (e.g., a finder of a lost pet) to input information for the lost pet into a graphical user interface. The information can include an image of the lost pet (e.g., photo taken using a mobile device) and a geographic location (e.g., city or zip code) where the pet was found. The image of the lost pet can be analyzed using an image analysis-tool to identify one or more phenotypes of the pet, and the phenotypes can be used to identify a set of pet profiles that correspond to the geographic location and phenotypes of the lost pet. A phenotype is an observable physical property of an animal, which can include, but is not limited to, the animal's appearance, developmental traits, and behavior. Also, analyzing the image using the phenotype extraction tool can determine when an accuracy of a user-provided phenotype is low, and replace the phenotype with a corrected phenotype that is more accurate. The pet profiles can be displayed in the graphic user interface. The user can input additional identification parameters for the pet, such as additional phenotypes, and a profile display region of the graphic user interface can be updated to include pet profiles that correspond to the identification parameters. More specifically, pet profiles can be removed from the profile display region of the graphic user interface when additional identification parameters input to the graphical user interface narrow the scope of a pet profile search, and pet profiles can be added to the profile display region of the graphic user interface when additional identification parameters input to the graphical user interface broaden the scope of the pet profile search.

The current technologies may benefit pet recovery efforts in a way that was not previously available. Previous pet recovery efforts tended to focus on reuniting a pet and owner using pet tags and implanted microchip devices to identify a found pet. However, in cases where a pet does not have a pet tag or implanted microchip, it can be very difficult to determine an identity of a pet and return the pet to an owner. The current technologies provide one solution to this problem by allowing owners to create a pet profile for their pet and make the pet profile public using the pet identification service, disclosed herein. Accordingly, in the case that the pet becomes lost and is subsequently discovered, the person who found the lost pet (i.e., the user) can provide identification parameters (e.g., images, phenotypes, and geographic information) to the pet identification service, and the user can be presented with a set of pet profiles that match the identification parameters. The user can narrow the set of pet profiles displayed in the graphical user interface by providing additional identification parameters, all while evaluating the pet profiles to determine if one of the pet profiles matches the lost pet.

It will be appreciated that the following description is not limited to pets but is also applicable to other types of domestic animals, as well as commercially propagated and associated operations. For example, the present technologies can be used in herd management for commercial farm operations. Accordingly, although the following description primarily refers to pet identification, it will be understood that a reference to a "pet" can equally reference any other type of domestic animal.

Figure 1B:
Figure 1C:
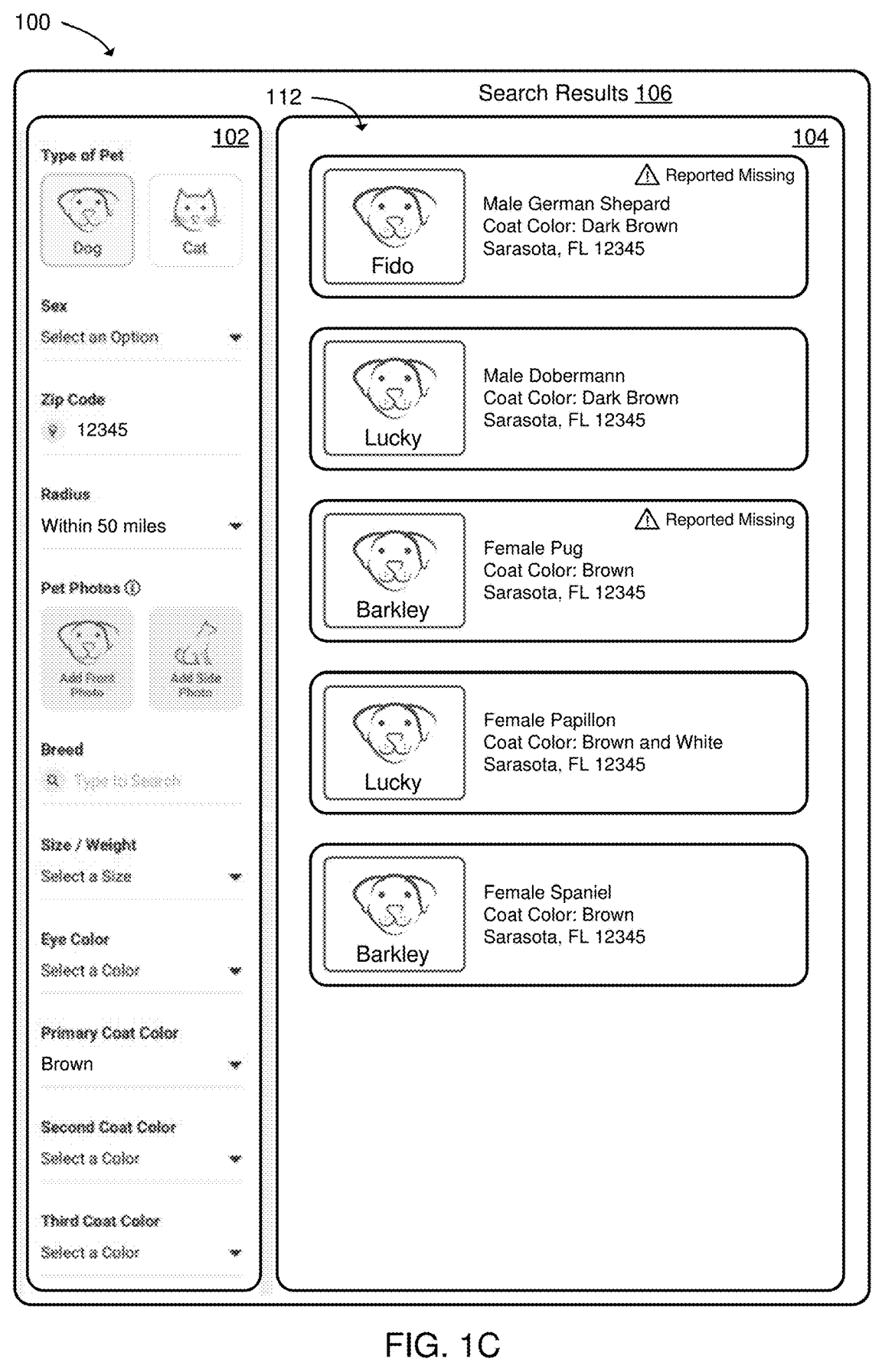

To further describe the present technology, examples are now provided with reference to the figures. FIGS. 1A-C illustrate example of a graphical user interface 100 for a pet identification service. As shown in FIG. 1A, the graphical user interface 100 can include an input parameter region 102 and a profile display region 104. The input parameter region 102 can include a number of user interface controls (e.g., text fields, dropdown lists, upload buttons, list boxes, date fields, and other input controls) to receive identification parameters for performing a search for a pet profile 108 that matches an unidentified (e.g., lost) pet. It will be appreciated that the interface controls can be associated with any identification parameter and are not limited to the examples shown in FIGS. 1A-C. A user interface control can refer to any single graphical tool or instrument or combination of graphics controls that permit a user to input information to a computer system. Common user interface controls include visual output for one or more buttons, text boxes, scroll bars, pictures, spin dials, list boxes, search boxes, select options, etc.

A user can provide one or more identification parameters for the unidentified pet via the user interface controls included in the input parameter region 102 of the graphical user interface 100. The identification parameters can be used by the pet identification service to query a data store for a set of pet profiles that match the identification parameters, as described in more detail later. Identification parameters for an unidentified pet can be traits, attributes, features, and the like that can be used to identify an unidentified pet. For example, identification parameters can include, but are not limited to: a pet type (e.g., dog or cat), a pet photo, a pet breed, a pet size, a pet weight, a pet gender, pet anatomical feature, a primary fur color, a secondary fur color, an eye color, physical injuries or scars, unique identification tools, branding, dyes, tattoos, tags, and/or a geographic location (e.g., country, city, zip code, etc.).

In one example, a user can start a search for a pet profile 108 by inputting an identification parameter into one of the controls included in the input parameter region 102 the graphical user interface 100. In response to receiving the input of the identification parameter, the pet identification service can automatically obtain a set of pet profiles 108 that correspond to the identification parameter and display the set of pet profiles 108 in the profile display region 104 of the graphical user interface 100 as a set of search results 106. The profile display region 104 of the graphical user interface 100 can dynamically display a set of pet profiles 108 to allow user-identification of a pet profile 108 that may be associated with an unidentified pet. More specifically, the profile display region 104 of the graphical user interface 100 can be dynamically updated to include pet profiles 108 that correspond to identification parameters input to the controls included in the input parameter region 102 of the graphical user interface 100. Display of the pet profiles 108 may be dynamic, in that, a part of the set of pet profiles 108 displayed in the profile display region 104 can be automatically removed when a pet profile 108 does not match each identification parameter shown in the input parameter region 102, and a pet profile 108 can be automatically added when the pet profile 108 matches a new or changed identification parameter entered into the input parameter region 102. In one example, as illustrated in FIG. 1A, a missing indicator 118 can be displayed with a pet profile 108 in the profile display region 104 of the graphical user interface 100 when a pet associated with the pet profile is reported missing.

For example, as shown in FIG. 1A, an initial set of pet profiles 108 displayed in the profile display region 104 can be broad, such that the set may include pet profiles 108 for every pet registered with the pet identification service that corresponds to an identification parameter (e.g., geographic location) input by the user. As shown in FIG. 1B, a user can narrow a set of pet profiles displayed in the profile display region 104 of the graphical user interface 100 by providing an additional identification parameter (e.g., primary coat color) using the controls in the input parameter region 102 of the graphical user interface 100. In response to receiving the additional identification parameter, the pet identification service can automatically obtain an updated set of pet profiles 110 that correspond to an aggregate of identification parameters (e.g., geographic location and primary coat color) provided by the user, and the updated set of pet profiles 110 can be displayed in the profile display region 104 of the graphical user interface 100. As shown in FIG. 1C, a user can broaden or change the set of pet profiles displayed in the profile display region 104 of the graphical user interface 100 by modifying an identification parameter (e.g., geographic search radius) using the controls in the input parameter region 102 of the graphical user interface 100. In response to modifying an identification parameter, the pet identification service can automatically obtain an updated set of pet profiles 112 that correspond to the identification parameters (e.g., geographic location and primary coat color) shown in the input parameter region 102, and the updated set of pet profiles 112 can be displayed in the profile display region 104 of the graphical user interface 100.

In one example configuration, a user may be instructed to start a search for a pet profile by providing an image (e.g., a photo captured using a mobile device) of an unidentified pet and a geographic location of the user and/or a location where the unidentified pet was found. The image and geographic location can be input using the controls included in the input parameter region 102 of the graphical user interface 100. In response to receiving the image, the pet identification service can analyze the image of the unidentified pet using a phenotype extraction tool to identify one or more phenotypes of the unidentified pet. In one example, the phenotypes obtained using the phenotype extraction tool can be provided to the pet identification service to be used as identification parameters for obtaining a set of pet profiles. Also, the controls included in the input parameter region 102 of the graphical user interface 100 can be populated with identification parameters that correspond to the phenotypes extracted from the image.

In another example, as described in greater detail later in association with FIG. 2, because the perception of an animal can vary from person to person, a phenotype for a pet provided by a user (e.g., a pet owner or a pet finder) as an identification parameter can be compared to a phenotype obtained from an image of the pet. The phenotype from the image can be obtained using the phenotype extraction tool, and the phenotype from the image can be used to determine the accuracy of the phenotype provided by the user. If the phenotype obtained from the image is more accurate than the user-provided phenotype, the user-provided identification parameter can be replaced with the phenotype obtained from the image After obtaining one or more identification parameters from the image, the pet identification service may automatically obtain a set of pet profiles that correspond to the identification parameters and the geographic location and, display the set of pet profiles in the profile display region 104 of the graphical user interface 100. The user can then narrow the search for a pet profile by inputting additional identification parameters. For example, the user can indicate a breed of the unidentified pet, and in response, the pet identification service can automatically obtain and display pet profiles that match both the geographic location and the breed of the pet. The user can evaluate the pet profiles displayed in profile display region 104 of the graphical user interface 100 to determine whether any of the pet profiles matches the unidentified pet. In the event that the size of the set of pet profiles is still too large, the user can provide additional identification parameters (e.g., size, weight, primary fur color, secondary fur color, eye color, etc.) to reduce the number of pet profiles included in the set, thereby making the size of the set of pet profiles more manageable. The user can continue to input additional identification parameters up until a maximum number of identification parameters has been reached.

Figure 2:
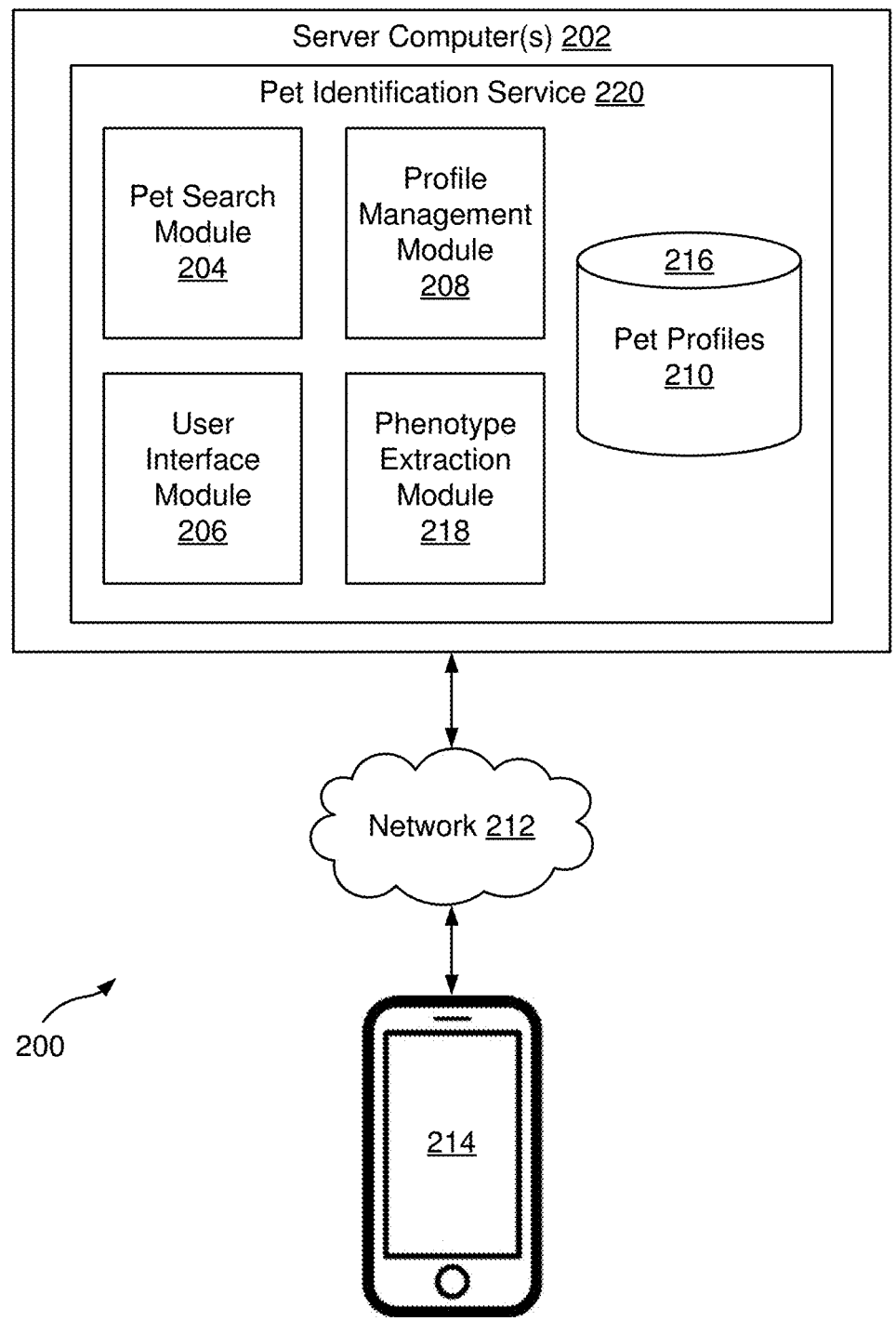
FIG. 2 is a block diagram that illustrates components of an example system environment on which the present technologies may be executed.

FIG. 2 is a block diagram that illustrates an example system 200 for a pet identification service 220. The system 200 can include one or more server computers 202 that are in network communication with a plurality of client devices 214. In one example, the system 200 can be a service-provider system comprising software applications, application programming interfaces (APIs), and user interfaces configured to implement a pet identification service 220. The server computer 202 may be located in a data center, service provider environment ("cloud" environment), or a hybrid environment (public and private cloud combination). The server computer(s) 202 can be configured to host a data store 216 used to store and manage pet profiles 210. A pet profile 210 may contain a record for a pet (domestic animal) that specifies a number of phenotypes, attributes, traits, characteristics, features, and other information for the pet. In addition, the pet profile 210 can contain information for a contact (e.g., owner) associated with the pet. The server computer(s) 202 can also be configured to execute processing modules used to execute the pet identification service 220. The processing modules can include a user interface module 206, a phenotype extraction module 218, a pet search module 204, a profile management module 208, and other modules.

The user interface module 206 provides a graphical user interface for interacting with the pet identification service 220. In one example, the graphical user interface may be a browser interface displayed in a browser application executed on a client device 214. In another example, the graphical user interface may be an application interface for a pet identification application executed on a client device 214. The graphical user interface can include a number of user interface controls, such as: text fields, dropdown lists, upload buttons, list boxes, date fields, and other input controls that allow a user to input identification parameters and other information used to perform a pet profile search. In particular, the graphical user interface can include a profile display region that can be dynamically updated to display pet profiles 210 that correspond to identification parameters provided, via user-input to the graphic user interface, and/or via analysis of a pet image uploaded to the pet identification service 220.

Figure 3A:
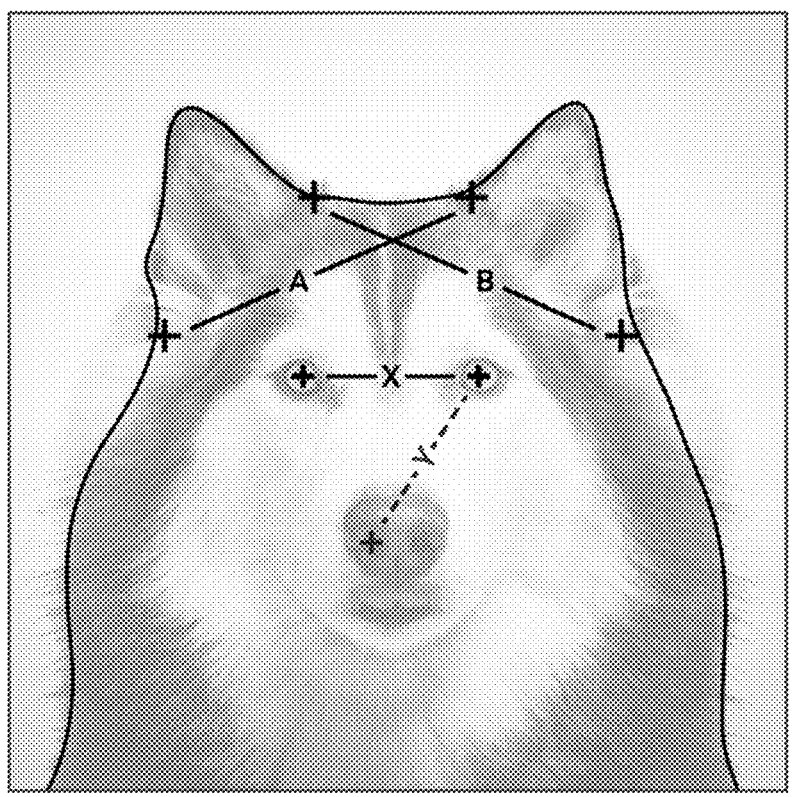
FIGS. 3A-B illustrate examples of a graphical user interface for indicating spatial distances on specified features of an unidentified pet using an image of the pet.
Figure 3B:
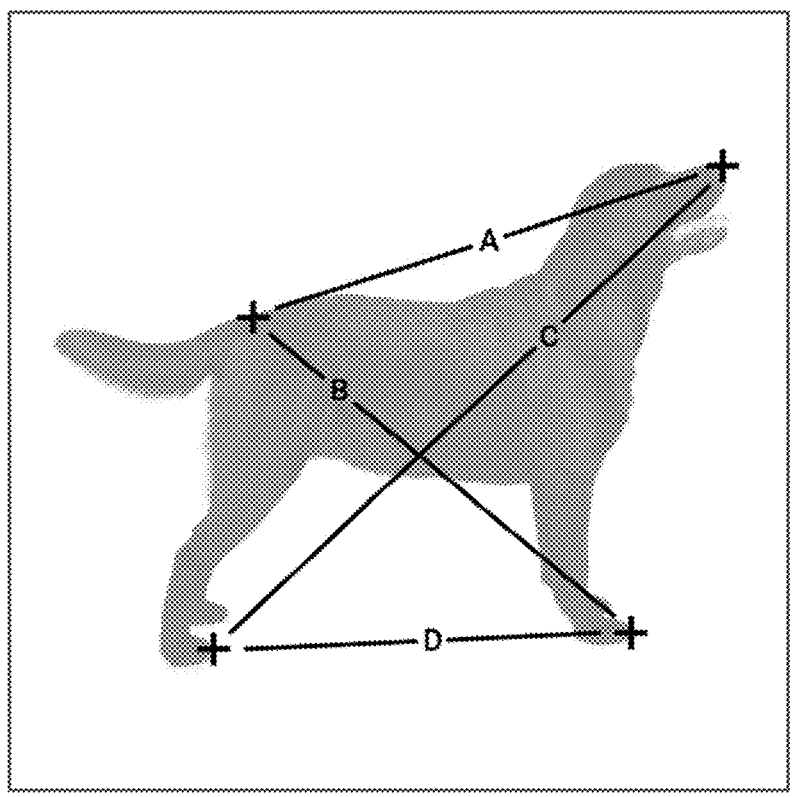

In one example, the graphical user interface can also include a graphical tool to allow a user to indicate a two-dimensional (2D) spatial distance between facial and/or body features of an unidentified pet represented in an image. As shown in FIGS. 3A-B, the graphical tool may allow a user to select areas in the image that represent facial and/or body features of an unidentified pet and digitally draw a line between the features on the image of the pet. The pet identification service 220 may provide instructions specifying which features a user should select. For example, the instructions may ask the user to select the eyes and nose of the pet. In one example, the graphical tool may digitally draw a line between features selected by the user.

Returning to FIG. 2, the profile management module 208 can be configured to create, update, and delete pet profiles 210 stored in the data store 216. Information for a pet profile 210 (e.g., phenotypes, attributes, traits, characteristics, anatomical features, owner information, location information, and other information) can be provided to the profile management module 208 via user input to the graphical user interface (illustratively shown in FIG. 1D). The profile management module 208 can use the information to create a new pet profile or update an existing pet profile. In one example, a pet profile 210 can be linked to a user (e.g., a pet owner) by way of a user identifier (ID). The profile management module 208 may allow the user to access pet profiles 210 linked to the user ID, and allow the user to view, edit, or delete the pet profiles linked to the user ID. The profile management module 208 may communicate with the user interface module 206 (e.g., via an application programming interface (API)) to receive pet profile information and instructions for creating, updating, and deleting pet profiles 210 in the data store 216.

Because the perception of pet phenotypes, such as color, size, and weight can vary from person to person, the pet identification service 220 can validate user-provided identification parameters by analyzing one or more images of a pet. The pet identification service 220 can perform this analysis for both pet-owner submitted identification parameters (e.g., as part of submitting a pet profile 210) and pet-finder submitted identification parameters. For example, a description of a pet provided by a pet owner may be different from a description of the pet provided by a pet finder. That is, a pet finder may indicate an eye color, coat color, size, weight, or other phenotype for a found pet that is different from what a pet owner has indicated in a pet profile 210. The pet identification service 220 can attempt to correct identification parameters provided by users by extracting phenotypes from a pet image submitted by the user and comparing the extracted phenotypes to the identification parameters.

More specifically, the phenotype extraction module 218 can be configured to analyze an image of a pet (domestic animal) using one or more image-analysis tools, utilities, or services to determine an accuracy of an identification parameter received as user-input to the graphical user interface by comparing the user-provided identification parameter to a phenotype extracted from the image. When the accuracy of the user-provided identification parameter is low (e.g., below 50%), the phenotype extraction module 218 may replace the user-provided identification parameter with a corrected identification parameter based on the phenotype obtained from the image. In one example, before replacing a user-provided identification parameter with a corrected identification parameter, the phenotype extraction module 218 may notify a user, via the graphical user interface, that the user-provided identification parameter is being replace with the corrected identification parameter. Also, in one example, the phenotype extraction module 218 may ask the user, via the graphical user interface, to confirm that the corrected identification parameter should replace the user-provided identification parameter.

Figure 4A:
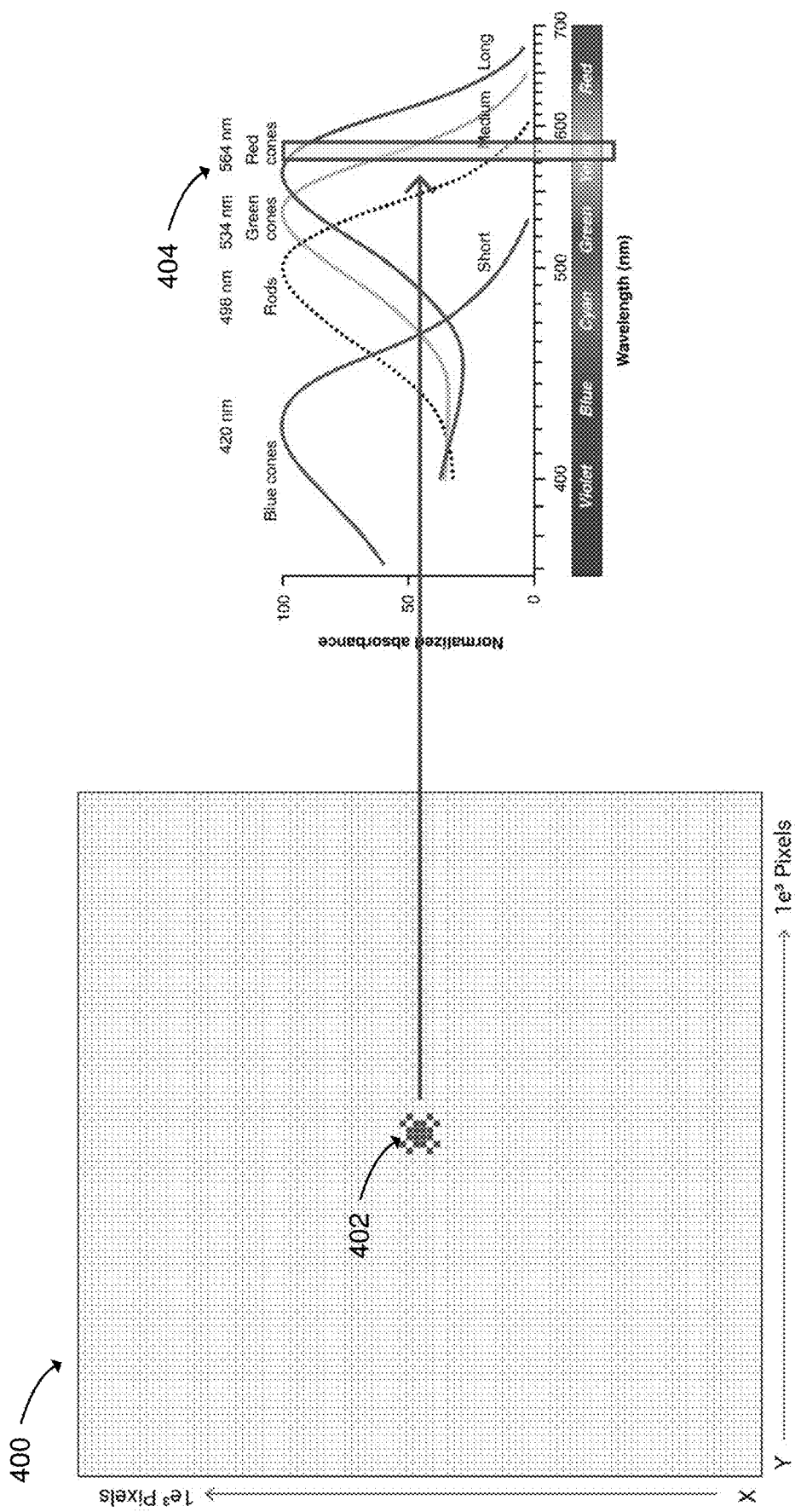
FIGS. 4A-D illustrate examples of analyzing an image of an unidentified pet to extract one or more color phenotypes and determine an estimated body-mass using an erosion shell volume measurement.

In one example, the phenotype extraction module 218 can extract color phenotypes from an image of a pet using an image-analysis tool that measures color intensity in a region of the image. The phenotype extraction module 218 can use the image-analysis tool to identify color pixel density in an image by measuring each pixel's color scale value. For example, as shown in FIG. 4A, the image-analysis tool can identify a color value of the pixels in an image 400 and correlate the color value to a nanometer (nm) color wavelength. As a non-limiting example, as shown on the left side of FIG. 4A, a sample of pixels 402 in the pixel array can be independently measured and assigned values based on the dominant wavelength as measured by any pixel that has equal to, or greater than, 90% of a value range, +/−10 nm. As shown on the right side of FIG. 4A, in this example, the values assigned to the sample pixels 402 may return a value equal to 580 nm (+/−10 nm), which may be presented as yellow or gold in color. The assigned color value can then be compared to colors available for selection in the graphical user interface, and the color that most accurately represents the assigned color value can be used as a color identification parameter for a pets coat color, eye color, etc.

Figure 4B:
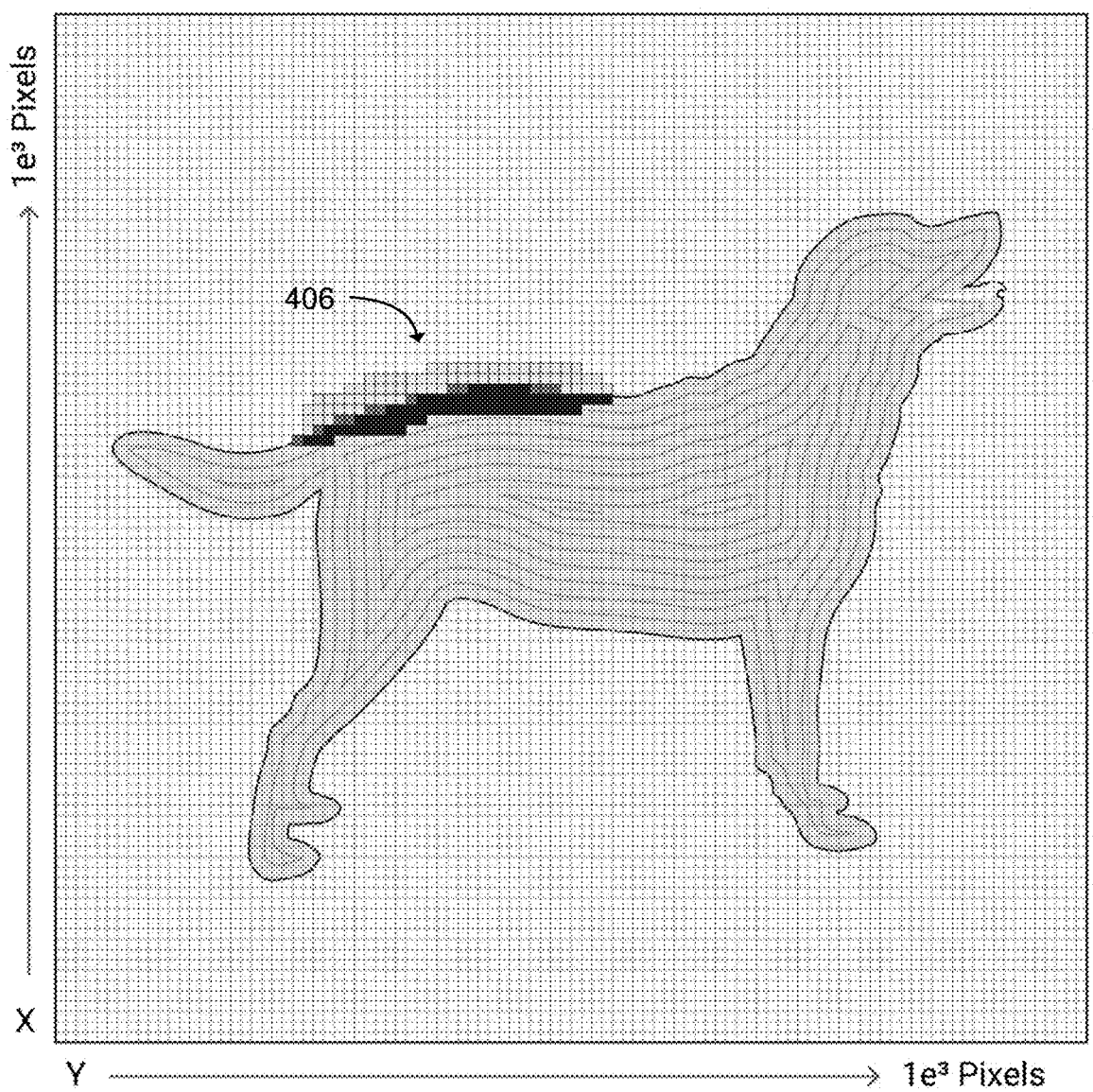

FIG. 4B, shows that an edge or "shell" of a pet or pet feature in an image can be determined by comparing the density of color values across the pixels 406 included in a pixel array. This can be performed by using a Neighboring Pixel Correlation Method (NPCM) that accounts for pixel saturation dilution across adjacent pixels in the pixel array. The outer edge of a pet or pet features can be identified by analyzing pixel color values as described above in relation to FIG. 4A. As a non-limiting example, an edge or "shell" of a pet or pet feature can be determined by identifying neighboring pixels that have a value of less than 20% of the color wavelength identified in FIG. 4A. A decreased wavelength saturation allows for distinction between the pet's measured mass and the image's background. As a non-limiting example, color values of adjacent pixels can be compared, and for any adjacent pixel that displays a saturation under 50%-20%, depending on the color, may indicate an edge of the pet or pet feature. White and black color values may be lower saturation (e.g., ~20%) as they are not colors but combinations of colors. In contrast, red or other non-mixed colors may be less of a percent decrease in saturation, (e.g., ~50%) as they are a single color wavelength. By discarding pixels under the saturation threshold, the remaining mass of saturated pixels can define the shape of the pet or pet characteristic in the image. After identifying a pet in an image, the image-analysis tool can detect a color intensity or color wavelength that occupies a percentage of pixels in an image and match the color intensity to a standardized color choice listed in the graphical user interface. For example, a color wavelength obtained from the image can be matched to a standardized color choice that has a color wavelength or range that substantially matches the color intensity in the image.

The image-analysis tool can analyze the portion of an image representing a pet and determine a percentage of one or more colors contained in the portion of the image. As an example, the image-analysis tool can determine a primary color contained in an image, as well as a secondary color, and so on. The primary color in the image can be identified as the color that occupies the highest percentage of pixels in the portion of the image, and secondary and tertiary colors can be determined as a percentage of remaining pixels in the image. As an illustration, an image of a pet having a black coat with white markings will have a high density of black pixels and a lower density of white pixels. Analysis of the image using the image-analysis tool may indicate a primary coat color of black, and a secondary coat color of white. As another illustration, the image-analysis tool can determine an eye color of a pet represented in an image by identifying the pixels in the image that represent the pet's eye(s), and identifying the color value of the pixels to determine which color represents a majority of the pixels.

After determining a percentage of one or more colors contained in a portion of an image, the phenotype extraction module 218 can compare a color intensity detected by the image-analysis tool to a color-identification parameter received as user-input to the graphical user interface to determine the accuracy of the color-identification parameter. As an illustration, a pet-owner or a pet-finder can upload images (e.g., front-facing and side-facing pictures) of a pet and input a color-identification parameter in the graphical user interface indicating that the primary color of the pet is red, as perceived by the pet-owner or pet-finder. The phenotype extraction module 218, via the image-analysis tool, can analyze the pixels in the images and determine that the highest percentage of pixels in the images correspond to a wavelength of approximately 700 nanometers (nm). The phenotype extraction module 218 can then compare the primary color provided by the pet owner or finder to the primary color determined via analysis of the images and confirm that the pet owner or finder has selected a primary color that substantially corresponds to the primary color represented in the images.

If the accuracy of the color-identification parameter received as user-input is low as compared to the color phenotype obtained from the image, then the phenotype extraction module 218 can replace the color-identification parameter provided by the user with a corrected color-identification parameter that is based on the color detected by the image-analysis tool. In one example, the phenotype extraction module 218 can determine whether the accuracy of a user-provided color-identification parameter is low as compared to a color phenotype obtained from an image by determining a difference between the user-provided color and the image-obtained within a color space (i.e., a specific organization of colors) or color wavelength range. As one example, in order to measure the difference between the two colors, a difference can be assigned to a distance between the two colors within the color space. As an example, in an equidistant-method color space, the color difference ΔE can be determined from the distance between the color places:

$$\Delta E = \sqrt{(L^*_1 - L^*_2)^2 + (a^*_1 - a^*_2)^2 + (b^*_1 - b^*_2)^2}$$

delta E can be assigned the following meanings: 0 (no color difference), 1 (slight color difference), 2 (small color difference), 3 (medium color difference), 4 (large color difference), and 5 (very large color difference). In the case that the distance between the colors in the color space is significant (e.g., medium color difference or large color difference), then the phenotype extraction module 218 can replace the user-provided color-identification parameter with a corrected color-identification parameter that is based on the color detected by the image-analysis tool. Otherwise, if there is not distance or the distance between the colors in the color space is small (e.g., small color difference or medium color difference), the color-identification parameter provided by the user can be retained and used in a search to identify pet profiles 210 that correspond to the color-identification parameter.

The phenotype extraction module 218, in another example, can determine that the accuracy of a user-provided color-identification parameter is low when the user-provided color-identification parameter does not correspond to a color phenotype obtained from an image. As an illustration, in the case that a user-provided color-identification parameter for a primary color of a pet is the value "black", and a color phenotype obtained from an image of the pet indicates that the primary color of the pet is the value "brown", then the phenotype extraction module 218 may determine that the user-provided color-identification parameter is incorrect and replace the user-provided color-identification parameter value of "black" with the corrected color-identification parameter value of "brown". Thereafter, the color-identification parameter obtained by the phenotype extraction module 218 can be provided to the pet search module 204, which as described later, can query the data store 216 for a pet profile 210 that corresponds to the color-identification parameter. In one example, before replacing a user-provided color-identification parameter with an image-acquired color phenotype, the phenotype extraction module 218 can ask a user (via the graphical user interface) whether the image-acquired color phenotype is more accurate than the color-identification parameter provided by the user. In the case that the user specifies that the image-acquired color phenotype is more accurate, then the pet search module 204 can be provided with the image-acquired color phenotype. If the user indicates that the user-provided color-identification parameter is more accurate, then the pet search module 204 can be provided with the image-acquired color phenotype.

In another example, the phenotype extraction module 218 can extract body-mass phenotypes (e.g., size and/or weight) from an image of a pet using an image-analysis tool that determines an estimated body-mass of the pet. The image-analysis tool can analyze a portion of an image representing a pet and determine an estimated body-mass of the pet by performing an erosion shell volume measurement. The erosion shell volume measurement can be performed by applying an erosion shell mask to an image of a pet and calculating an estimated body-mass using the erosion shell mask.

Figure 4C:
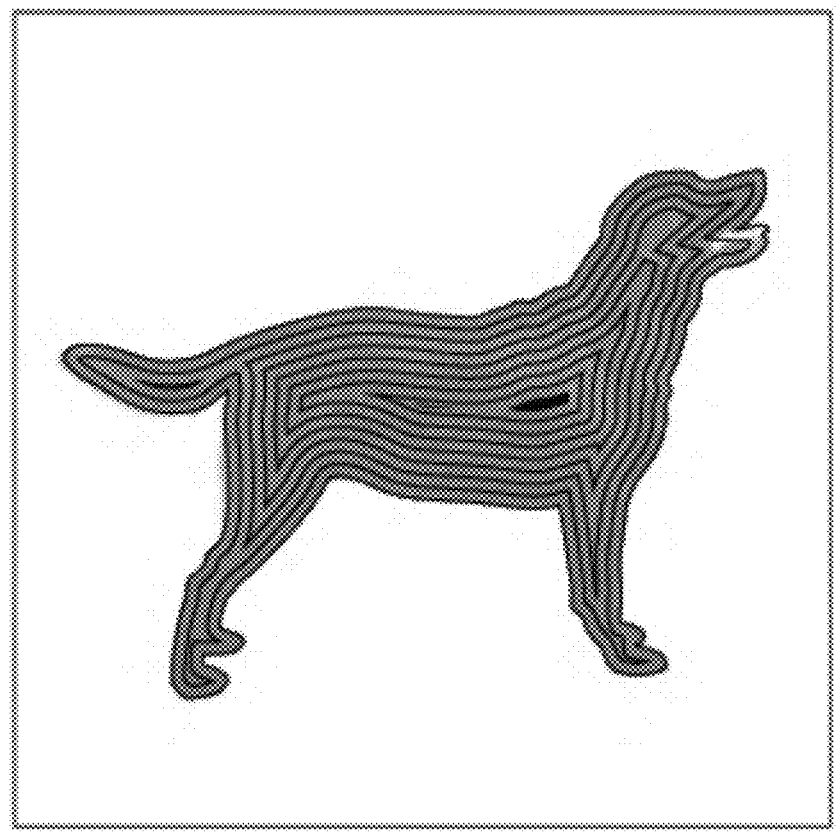
Figure 4D:
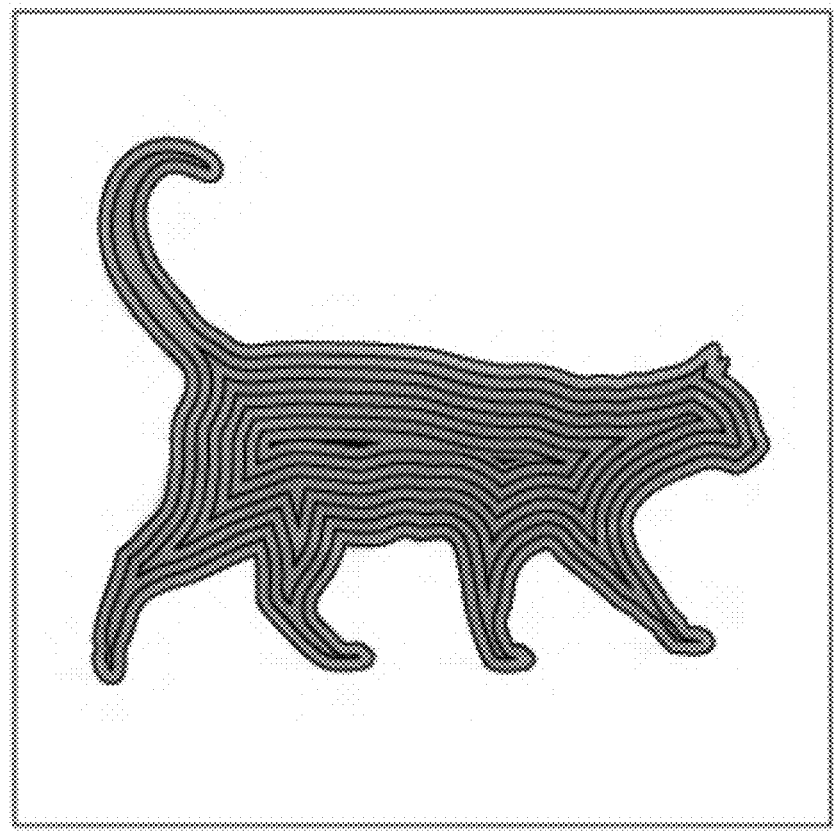

As shown in FIGS. 4B-D, the erosion shell volume measurement may comprise defining an edge of a pet identified in an image, as explained earlier, and creating a series of erosion shells that extend to a center mass of the pet represented in the image. For example, the image-analysis tool can identify a pixel color density in an image indicating an outer edge of the pet, and then use a set distance or spacing between concentric rings, moving from the outside of the pet's mass to the center of the pet's mass until a space between the concentric rings is substantially zero. As a non-limiting example, starting from the edge, a series of erosion shells can be created to have a 15 pixel width or other measurement criterion, for example using 400 nm erosion rings, where an outer erosion shell encompasses inner erosion shells and a center mass erosion shell has a width that is less than 15 pixels. A mass measurement of each erosion shell can be determined and the mass measurements of the erosion shells can be summed to produce an estimated body-mass of the pet. A pet-size identification parameter (e.g., S, M, L, XL, or weight range) that substantially corresponds to the estimated body-mass of the pet can be assigned to the pet in a pet profile. Because images submitted by pet-owners and pet-finders are most likely captured using different cameras (e.g., differences in light, zoom, focal length, etc.), erosion shell volume measurement differences between a pet-owner submitted image and a pet-finder submitted image can be corrected by normalizing the measurements (e.g., normalize pixel density in an area of an image that represents a pet). Normalizing the erosion shell volume measurements can correct for differences in the estimated size and weight of a pet between the two images.

Referring again to FIG. 2, after calculating an estimated body-mass measurement based on an image of a pet, the phenotype extraction module 218 can compare the body-mass measurement to a body-mass identification parameter received as user-input to the graphical user interface to determine the accuracy of the body-mass identification parameter. If the accuracy of the body-mass identification parameter received as user-input is low as compared to the estimated body-mass measurement obtained from the image of the pet, then the phenotype extraction module 218 may replace the body-mass identification parameter provided by the user with a corrected body-mass identification parameter that is based on the estimated body-mass measurement calculated by the image-analysis tool. A body-mass identification parameter obtained by the phenotype extraction module 218 can be provided to the pet search module 204, which as described below, can query the data store 216 for a pet profile 210 that corresponds to the body-mass identification parameter.

In yet another example, the phenotype extraction module 218 can determine a two-dimensional (2D) spatial distance between specified features of a pet represented in an image, and the 2D spatial distance can be compared to images in pet profiles 210 to identify a pet that has features which substantially correspond to the 2D spatial distance. As shown in FIGS. 3A-B, the spatial distance measurements can include facial feature measurements, ear measurements, body feature measurements (e.g., nose to base of tail, nose to back foot, etc.). Any measurement combination can be performed using front-facing images and side-facing images, including those shown in FIGS. 3A-B. Returning to FIG. 2, as an illustration, a user (e.g., a pet owner or a pet finder) can upload an image of a pet to the server computer 202, and using a graphical tool included in the graphical user interface, the user can indicate two features of the pet (e.g., eyes, nose, nostrils, ears, base of tail, feet, etc.) and digitally draw a line between the two features. The phenotype extraction module 204 can then analyze the pixels in the image to determine the dimensions of the pet and calculate a distance between the two identified features of the pet. In one example, 2D spatial distances can be determined using computer vision and a scale of an object (e.g., eye) identified in the image. Because images submitted by pet-owners and pet-finders are most likely captured using different cameras, in one example, pet size differences between the images can be corrected using the technique described above that uses image-analysis to analyze an image and determine an estimated body-mass of a pet by performing an erosion shell volume measurement.

A 2D spatial-distance identification parameter obtained by the phenotype extraction module 218 can be provided to the pet search module 204, which as described below, can query the data store 216 for a pet profile 210 that corresponds to the 2D spatial-distance identification parameter. As an example, each pet profile 210 may include a body-mass for a pet (which can be calculated when a pet profile 210 is created using the technique described above) and the body-mass may be searchable to identify a pet that has a body-mass that corresponds to the estimated body-mass calculated using the erosion shell volume measurement. Thus, a lost pet body-mass can be compared to the body-mass of pet profiles to identify candidate matches within a predetermined variation, e.g. within 5% or within 10%. The predetermined variation of identification parameters can be preset or chosen by a user based on desired confidence or to increase the number of potential matching records.

The pet search module 204 can be configured to search the data store 216 for pet profiles that match identification parameters specified by a user. The user interface module 206 may communicate with the pet search module 204 (e.g., via an API) to provide identification parameters input to the graphical user interface to the pet search module 204. In one example, the pet search module 204 can be configured to perform an automatic search of pet profiles 210 stored in the data store 216 in response to receiving user-input of an identification parameter into the graphical user interface. For example, the user interface module 206 may monitor user interface controls for user-input and, in response to detecting input of an identification parameter, provide the identification parameter to the pet search module 204. In response to receiving the identification parameter, the pet search module 204 may query to the data store 216 for a set of pet profiles 210 that matches the identification parameter. In the case that the query returns at least one pet profile 210, the pet search module 204 can provide the pet profile 210 to the user interface module 206, which can display the pet profile 210 in the graphical user interface.

As described earlier, a user can narrow a search of pet profiles 210 by submitting additional identification parameters. In one example, for each additional identification parameter provided by a user, the pet search module 204 may obtain an updated set of pet profiles 210 from the data store 216 that match each identification parameter provided by the user. For example, the pet search module 204 may obtain an initial set of pet profiles 210 that correspond to a first identification parameter (e.g., pet type) provided by a user and provide the initial set of pet profiles 210 to the user interface module 206 for display in the graphical user interface. In response to receiving a second identification parameter (e.g., breed) from the user, the pet search module 204 may obtain an updated set of pet profiles 210 by querying the data store 216 for pet profiles 210 that correspond to both the first and second identification parameters. Thereafter, the pet search module 204 may provide the updated set of pet profiles 210 to the user interface module 206 for display in the graphical user interface. In some examples, the pet search module 204 can include input features that help a user to input identification parameters, such as autocorrect, word completion, predictive text, and/or context completion.

In another example, the pet search module 204 may temporarily store (cache) pet profiles 210 obtained from the data store 216 in computer memory (e.g., RAM). Thereafter, in response to receiving additional identification parameters from a user, the pet search module 204 may evaluate the cache of pet profiles 210 to determine which pet profiles 210 do not correspond to the identification parameters and remove the pet profiles 210 from the cache. Removing pet profiles 210 from the cache may cause the pet profiles 210 to be removed from display in the graphical user interface. For example, the user interface module 206 may monitor the cache of pet profiles 210 to detect changes to the cache and, in response to detecting a change to the cache, update the graphical user interface to display only those pet profiles 210 stored in the cache.

In another example, the pet search module 204 can be configured to initiate a pet profile search in response to a user-instruction submitted via the graphical user interface. For example, a user can input a plurality of identification parameter into the graphical user interface and select a search button contained in the graphical user interface. The user interface module 206 can detect a selection event triggered when a user selects (clicks or touches) the search button and provide the identification parameters to the pet search module 204. In response, the pet search module 204 may query the data store 216 for pet profiles 210 that match the identification parameters and return the pet profiles 210 to the user interface module 206 for display in the graphical user interface.

In the event that a user (pet finder) identifies a pet profile 210 displayed in the user interface as being associated with an unidentified pet, the user can select the pet profile 210 to obtain information for a contact associated with the pet profile 210. For example, the user interface module 206 can receive a user-selection of a pet profile 210 displayed in the graphical user interface and obtain information for a contact associated with the pet profile 210 from the data store 216. The user interface module 206 can then display the information for the contact in the graphical user interface. In another example, a user (pet finder) can submit a request to the pet identification service 220 for contact information for a pet owner associated with a pet profile 210, and a vetting process can be performed to vet the user prior to sending the contact information to the user.

In one example configuration, the pet identification service 220 can include libraries (not shown) of pet images obtained from publically accessible electronic resources, such as websites, image repositories, and the like. The pet images contained in the libraries can be used to identify unidentified pets using any of the techniques described above. In one example, a pet library can include publically available contact information for a pet. For example, a pet image obtained from a social network website can include user account information and other metadata which can be used to identify a contact associated with the pet. In the event that the pet in the image is lost and a user submits a photo of the pet to the pet identification service 220, the contact can be notified.

The various processes and/or other functionality contained within the system 200 may be executed on one or more processors that are in communication with one or more memory modules. The system 200 may include a number of computing devices that are arranged, for example, in one or more server banks or computer banks or other arrangements. The computing devices may support a computing environment using hypervisors, virtual machine monitors (VMMs) and other virtualization software. The term "data store" may refer to any device or combination of devices capable of storing, accessing, organizing and/or retrieving data, which may include any combination and number of data servers, relational databases, object-oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls, function calls, or other network commands that may be made in relation to the processing modules included in the system 200 may be implemented according to different technologies, including, but not limited to, Representational state transfer (REST), Simple Object Access Protocol (SOAP), Remote Procedure Call (RPC), and other types calls and commands. REST is an architectural style for distributed hypermedia systems. A RESTful API (which may also be referred to as a RESTful web service) is a web service API implemented using HTTP and REST technology. SOAP is a protocol for exchanging information in the context of Web-based services. An RPC is a form of inter-process communication (IPC) between different processes having different address spaces. If on the same host machine, the processes have distinct virtual address spaces, even though the physical address space may be the same. If the processes are on different host machines, the physical address space may be different.

The server computer 202 may communicate with a client device 214 over a network 212. The network 212 may include any useful computing network, including an intranet, the Internet, a local area network, a wide area network, a wireless data network, or any other such network or combination thereof. Components utilized for such a system may depend at least in part upon the type of network and/or environment selected. Communication over the network 212 may be enabled by wired or wireless connections and combinations thereof. Although the client device 214 shown in FIG. 2 is illustrated as a mobile device, it will be appreciated that a client device can include any computing device capable of communicating with the server computer 202 over a network 212 to allow a user to access and interact with the pet identification service 220.

FIG. 2 illustrates that certain processing modules may be discussed in connection with this technology, and these processing modules may be implemented as computing services. In one example configuration, a processing module may be considered a service with one or more processes executing on a server computer or other computer hardware. Such services may be centrally hosted functionality or a service application that may receive requests and provide output to other services or consumer devices. For example, processing modules providing services may be considered on-demand computing that are hosted in a server computer, virtualized service environment, grid, or cluster computing system. An API may be provided for each processing module to enable a second processing module to send requests to and receive output from the first processing module. Such APIs may also allow third parties to interface with the processing module and make requests and receive output from the processing modules. While FIG. 2 illustrates one example of a system environment that may implement the techniques above, many other similar or different system environments are possible. The example system environments discussed and illustrated above are merely representative and not limiting.

Figure 5:
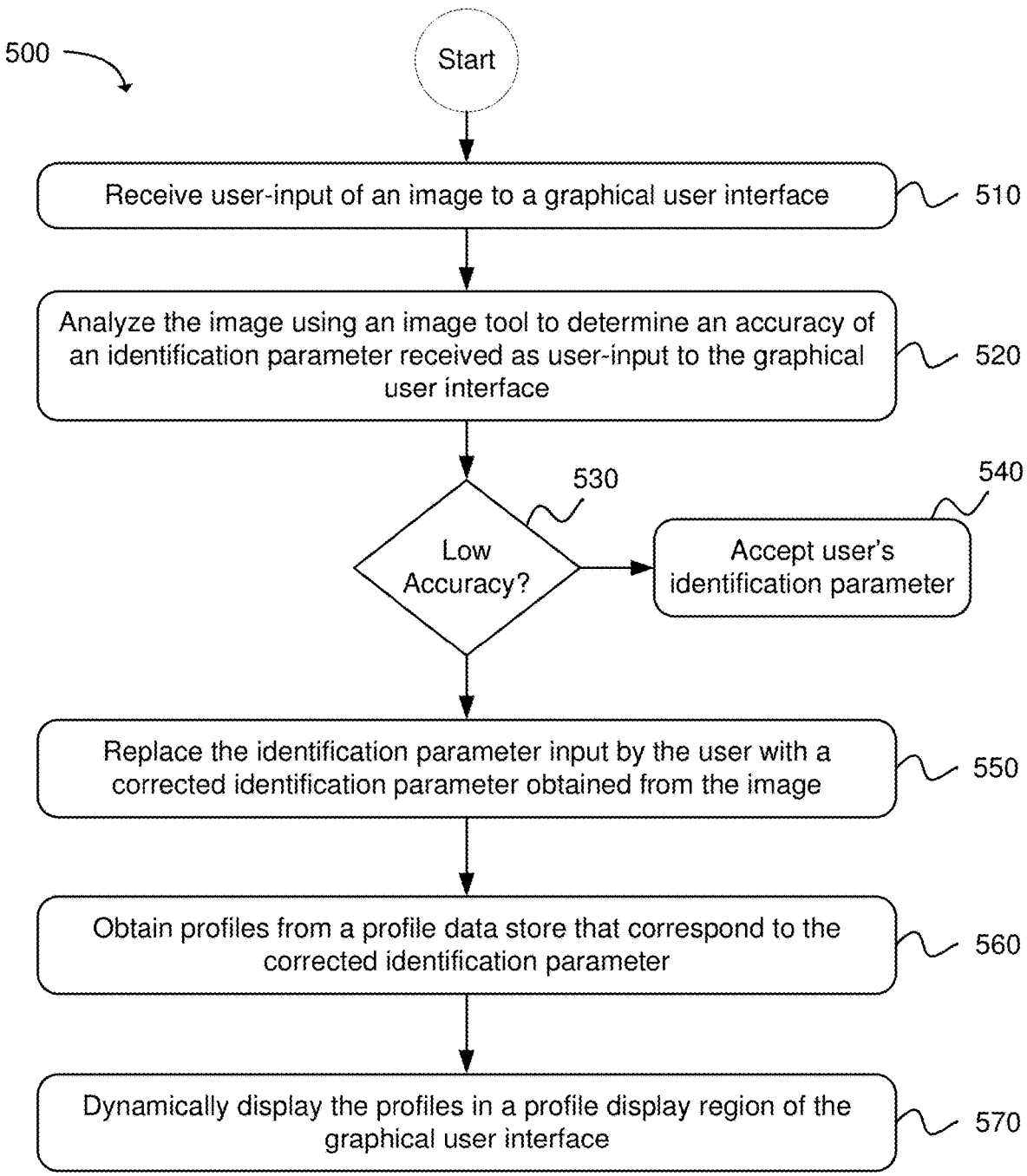
FIG. 5 is a flow diagram that illustrates an example method for displaying domestic animal profiles in a graphical user interface.

FIG. 5 is a flow diagram that illustrates an example method for displaying domestic animal profiles in a graphical user interface. As in block 510, user-input to the graphical user interface can be received. The user-input can comprise identification parameters that include: a phenotype for a domestic animal, an image of the domestic animal, and a geographic location of the domestic animal. An identification parameter can include any of a domestic animal: type, breed, gender, age, size, weight, anatomical feature, primary fur color, secondary fur color, eye color, marking type, marking location, and the like.

As in block 520, the image of the domestic animal can be analyzed using one or more image tools to determine an accuracy of an identification parameter received as user-input to the graphical user interface, as described earlier. In one example, the image analysis tool measures color intensity in a region of the image, and a color intensity detected by the image analysis tool can be compared to a color identification parameter received as user-input to the graphical user interface to determine the accuracy of the color identification parameter. In another example, the image analysis tool determines an estimated body mass of the domestic animal, and a body mass determined by the image analysis tool can be compared to a body-mass identification parameter received as input to the graphical user interface to determine the accuracy of the body-mass identification parameter. In yet another example, the image analysis tool determines a two-dimensional (2D) spatial distance between specified features of the domestic animal represented in the image, and the 2D spatial distance can be compared to images in the domestic animal profiles to identify a domestic animal that has features which substantially correspond to the 2D spatial distance.

As in block 530, the method 500 can determine whether an identification parameter (e.g., phenotype) input to the graphical user interface should be replaced with a corrected identification parameter obtained from the image. In the case that the identification parameter input to the graphical user interface corresponds to a phenotype extracted from the image of the domestic animal, then as in block 540, the user's identification parameter can be accepted and used to obtain domestic animal profiles for display in the graphical user interface. However, in the case that the accuracy of the identification parameter input to the graphical user interface is low, then as in block 550, the identification parameter can be replaced with a corrected identification parameter obtained from the image of the domestic animal.

As in block 560, a set of domestic animal profiles may be obtained from a profile data store that matches the identification parameters, which, as described above, may include corrected identification parameters. As in block 570, the set of domestic animal profiles may be dynamically displayed in the graphical user interface to allow a user to determine whether a domestic animal profile displayed in the profile display region of the graphical user interface is associated with the unidentified domestic animal, wherein the profile display region of the graphical user interface can be dynamically updated to include domestic animal profiles that correspond to identification parameters input to the graphic user interface. In the case that the user identifies a domestic animal profile as being associated with the unidentified domestic animal, the method can receive a user selection of the domestic animal profile, which may assign an identity to the unidentified domestic animal, and information for a contact associated with the domestic animal profile can be obtained to allow the user to notify the contact regarding the found domestic animal.

Figure 6:
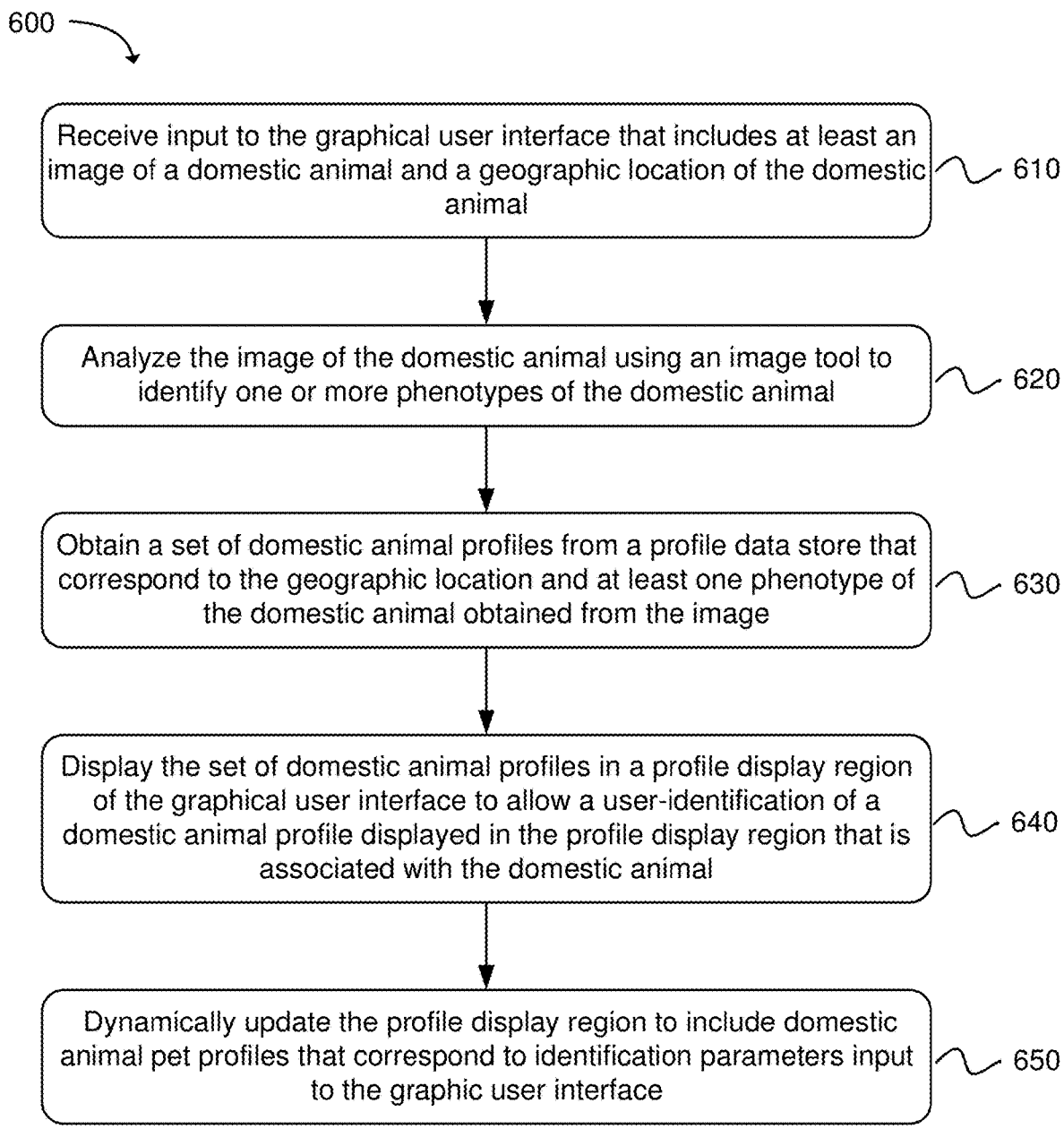
FIG. 6 is a flow diagram illustrating another example method for displaying domestic animal profiles in a graphical user interface.

FIG. 6 is a flow diagram that illustrates an example method 600 for displaying domestic animal profiles in a graphical user interface. Starting in block 610, input to the graphical user interface can be received, where in the input can include at least an image of a domestic animal and a geographic location of the domestic animal, which may be unidentified (lost).

As in block 620, the image of the domestic animal can be analyzed using an image tool to identify one or more phenotypes of the domestic animal. In one example, analyzing the image can include using the image analysis tool to determine an accuracy of an identification parameter received as user-input to the graphical user interface, wherein the identification parameter can be replaced with a corrected identification parameter determined via analysis of the image of the domestic animal when it is determined that the accuracy of the identification parameter received as user-input is low. As one example, the image analysis tool measures color intensity in a region of the image, and a color intensity detected by the image analysis tool can be compared to a color identification parameter received as user-input to the graphical user interface to determine the accuracy of the color identification parameter. As another example, the image analysis tool determines an estimated body mass of the domestic animal, and a body mass determined by the image analysis tool can be compared to a body-mass identification parameter received as user-input to the graphical user interface to determine the accuracy of the body-mass identification parameter.

In another example, the image analysis tool can be used to determine a two-dimensional (2D) spatial distance between specified features of the domestic animal represented in the image, and the 2D spatial distance can be compared to images in the domestic animal profiles to identify a domestic animal that has features which substantially correspond to the 2D spatial distance. For example, the image analysis tool can display the image in the graphical user interface to allow a user to indicate a 2D spatial distance between specified features of a domestic animal represented in an image. For instance, the graphical tool may enable the user to select areas in the image that represent the specified features of the domestic animal and digitally draw an axis between the specified features. The method can receive the 2D spatial distance input to the graphical user interface and use the 2D spatial distance to identify a domestic animal that has features which substantially correspond to the 2D spatial distance.

After obtaining one or more phenotypes of the domestic animal from the image of the domestic animal, a set of domestic animal profiles can be obtained from a profile data store that correspond to the geographic location and the phenotypes of the domestic animal obtained from the image, as in block 630. As in block 640, method 600 can dynamically display the set of domestic animal profiles in a profile display region of the graphical user interface to allow user-identification of a domestic animal profile that is associated with the domestic animal. As shown in block 650 the profile display region of the graphical user interface can be dynamically updated to include domestic animal profiles that correspond to identification parameters input to the graphic user interface. Also, in one example, a missing indicator can be displayed with a domestic animal profile in the profile display region of the graphical user interface when a domestic animal associated with the domestic animal profile is reported missing. In the case that the user recognizes a domestic animal profile as being associated with the unidentified domestic animal, the method 600 can receive a user-selection of a domestic animal profile displayed in the graphical user interface and obtain information for a contact associated with the domestic animal profile. The method 600 may then display information for the contact in the graphical user interface.

Figure 7:
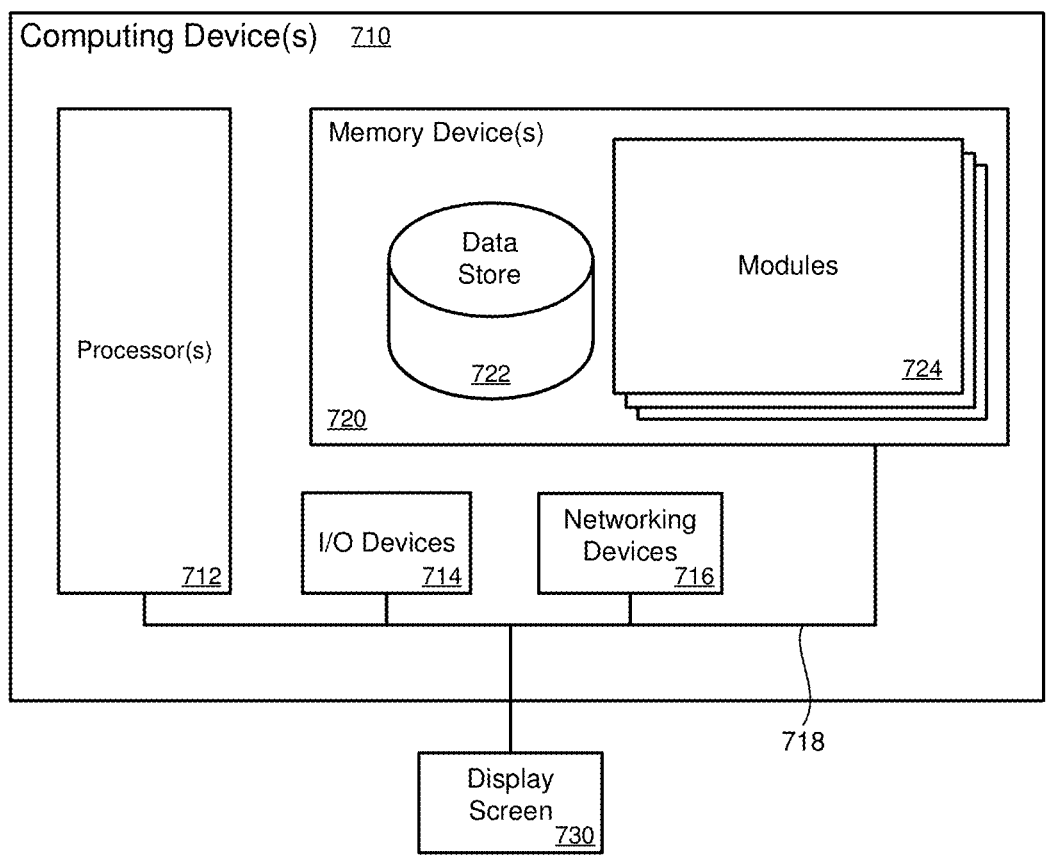
FIG. 7 is a block diagram illustrating an example of a computing device that may be used to execute the present technologies described herein.

FIG. 7 illustrates a computing device 710 on which modules of this technology may execute. A computing device 710 is illustrated on which a high-level example of the technology may be executed. The computing device 710 may include one or more processors 712 that are in communication with memory devices 720. The computing device 710 may include a local communication interface 718 for the components in the computing device 710. For example, the local communication interface 718 may be a local data bus and/or any related address or control busses as may be desired.

The memory device 720 may contain modules 724 that are executable by the processor(s) 712 and data for the modules 724. The modules 724 can include a user interface module, a profile management module, a pet search module, and other modules. The modules 724 may execute the functions described earlier. A data store 722 may also be located in the memory device 720 for storing data related to the modules 724 and other applications along with an operating system that is executable by the processor(s) 712.

Other applications may also be stored in the memory device 720 and may be executable by the processor(s) 712. Components or modules discussed in this description may be implemented in the form of software using high-level programming languages that are compiled, interpreted or executed using a hybrid of the methods.

The computing device 710 may also have access to I/O (input/output) devices 714 that are usable by the computing device 710. One example of an I/O device may include a display screen 730. Networking devices 716 and similar communication devices may be included in the computing device 710. The networking devices 716 may be wired or wireless networking devices that connect to the internet, a LAN, WAN, or other computing network.

The components or modules that are shown as being stored in the memory device 720 may be executed by the processor(s) 712. The term "executable" may mean a program file that is in a form that may be executed by a processor 712. For example, a program in a higher-level language may be compiled into machine code in a format that may be loaded into a random-access portion of the memory device 720 and executed by the processor 712, or source code may be loaded by another executable program and interpreted to generate instructions in a random-access portion of the memory to be executed by a processor. The executable program may be stored in any portion or component of the memory device 720. For example, the memory device 720 may be random access memory (RAM), read only memory (ROM), flash memory, a solid-state drive, memory card, a hard drive, optical disk, floppy disk, magnetic tape, or any other memory components.

The processor 712 may represent multiple processors and the memory device 720 may represent multiple memory units that operate in parallel to the processing circuits. This may provide parallel processing channels for the processes and data in the system. The local communication interface 718 may be used as a network to facilitate communication between any of the multiple processors and multiple memories. The local communication interface 718 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The present technologies disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

The present technology described here may also be stored on a computer readable storage medium that includes volatile and non-volatile, removable and non-removable media implemented with any technology for the storage of information such as computer readable instructions, data structures, program modules, or other data. Computer readable storage media can include a non-transitory machine-readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other non-transitory machine-readable computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computer implemented method for displaying domestic animal profiles in a graphical user interface, comprising:
   receiving input to the graphical user interface that includes at least an image of a domestic animal and a geographic location of the domestic animal;
   analyzing the image of the domestic animal using an image-analysis tool to identify one or more phenotypes of the domestic animal;
   obtaining a set of domestic animal profiles from a profile data store that correspond to the geographic location and at least one phenotype of the domestic animal obtained from the image; and
   dynamically displaying the set of domestic animal profiles in a profile display region of the graphical user interface to allow user-identification of a domestic animal profile displayed in the profile display region that is associated with the domestic animal,
   wherein the profile display region of the graphical user interface is dynamically updated to include domestic animal profiles that correspond to identification parameters input to the graphic user interface.

2. The computer implemented method in claim 1, wherein analyzing the image of the domestic animal further comprises:
   analyzing the image using an image-analysis tool to determine an accuracy of an identification parameter received as user-input to the graphical user interface, wherein the identification parameter is replaced with a corrected identification parameter determined via analysis of the image of the domestic animal when it is determined that the accuracy of the identification parameter received as user-input is low.

3. The computer implemented method in claim 2, wherein the image-analysis tool measures color intensity in a region of the image, and a color intensity detected by the image-analysis tool is compared to a color-identification parameter received as user-input to the graphical user interface to determine the accuracy of the color-identification parameter.

4. The computer implemented method in claim 2, wherein the image-analysis tool determines an estimated body-mass of the domestic animal, and a body-mass determined by the image-analysis tool is compared to a body-mass identification parameter received as user-input to the graphical user interface to determine the accuracy of the body-mass identification parameter.

5. The computer implemented method in claim 2, wherein the image-analysis tool determines a two-dimensional (2D) spatial distance between specified features of the domestic animal represented in the image, and the 2D spatial distance is compared to images in the domestic animal profiles to identify a domestic animal that has features which substantially correspond to the 2D spatial distance.

6. The computer implemented method in claim 5, wherein the image-analysis tool:
   displays the image in the graphical user interface to allow a user to indicate a 2D spatial distance between specified features of a domestic animal represented in an image; and
   receives the 2D spatial distance input to the graphical user interface to be used to identify a domestic animal that has features which substantially correspond to the 2D spatial distance.

7. The computer implemented method in claim 6, wherein a graphical tool enables the user to select areas in the image that represent the specified features of the domestic animal and digitally draw an axis between the specified features.

8. The computer implemented method in claim 1, further comprising receiving identification parameter input to the graphical user interface that includes any of a domestic animal: type, breed, gender, age, size, weight, anatomical feature, primary fur color, secondary fur color, eye color, marking type, and marking location.

9. The computer implemented method in claim 1, further comprising displaying a missing indicator with a domestic animal profile in the profile display region of the graphical user interface when a domestic animal associated with the domestic animal profile is reported missing.

10. The computer implemented method in claim 1, further comprising:
    receiving a user-selection of a domestic animal profile displayed in the graphical user interface;
    obtaining information for a contact associated with the domestic animal profile; and
    displaying the information for the contact in the graphical user interface.

11. A system for displaying domestic animal profiles in a graphical user interface, comprising:
    a profile data store;
    at least one processor; and
    a memory device including instructions that, when executed by the at least one processor, cause the system to:
    receive input to the graphical user interface that includes: at least one phenotype of the domestic animal, an image of the domestic animal, and a geographic location of the domestic animal;

analyze the image using an image-analysis tool to determine an accuracy of the phenotype received as input to the graphical user interface, wherein the phenotype is replaced with a corrected phenotype determined via analysis of the image of the domestic animal when it is determined that the accuracy of the phenotype input to the graphical user interface is low;

obtain a set of domestic animal profiles from the profile data store that correspond to the geographic location and at least one phenotype of the domestic animal; and dynamically display the set of domestic animal profiles in a profile display region of the graphical user interface to allow user-identification of a domestic animal profile displayed in the profile display region that is associated with the domestic animal, wherein the profile display region of the graphical user interface is dynamically updated to include domestic animal profiles that correspond to identification parameters input to the graphic user interface.

12. The system in claim 10, wherein the image-analysis tool measures color intensity in a region of the image, and a color intensity detected by the image-analysis tool is compared to a color-identification parameter received as user-input to the graphical user interface to determine accuracy of the color-identification parameter.

13. The system in claim 10, wherein the image-analysis tool determines an estimated body-mass of the domestic animal, and a body-mass determined by the image-analysis tool is compared to a body-mass identification parameter received as input to the graphical user interface to determine accuracy of the body-mass identification parameter.

14. The system in claim 10, wherein the image-analysis tool determines a two-dimensional (2D) spatial distance between specified features of the domestic animal represented in the image, and the 2D spatial distance is compared to images in the domestic animal profiles to identify a domestic animal that has features which substantially correspond to the 2D spatial distance.

15. The system in claim 13, wherein the image-analysis tool:
displays the image in the graphical user interface to allow a user to indicate a 2D spatial distance between specified features of a domestic animal represented in an image; and
receives the 2D spatial distance input to the graphical user interface to be used to identify a domestic animal that has features which substantially correspond to the 2D spatial distance, wherein a graphical tool enables the user to select areas in the image that represent the specified features of the domestic animal and digitally draw an axis between the specified features.

16. A non-transitory machine readable storage medium including instructions embodied thereon for displaying domestic animal profiles in a graphical user interface, wherein the instructions, when executed by at least one processor:

receive input to a graphical user interface that includes: at least one phenotype of the domestic animal, an image of the domestic animal, and a geographic location of the domestic animal;

analyze the image using an image-analysis tool to determine an accuracy of the phenotype received as input to the graphical user interface, wherein the phenotype is replaced with a corrected phenotype determined via analysis of the image of the domestic animal when it is determined that the accuracy of the phenotype input to the graphical user interface is low;

obtain domestic animal profiles from a profile data store that correspond to the geographic location and at least one phenotype of the domestic animal; and dynamically display the domestic animal profiles in a profile display region of the graphical user interface to allow user-identification of a domestic animal profile displayed in the profile display region that is associated with the domestic animal, wherein the profile display region of the graphical user interface is dynamically updated to include domestic animal profiles that correspond to identification parameters input to the graphic user interface.

17. The non-transitory machine readable storage medium in claim 15, wherein the image-analysis tool measures color intensity in a region of the image, and a color intensity detected by the image-analysis tool is compared to a color-identification parameter received as user-input to the graphical user interface to determine the accuracy of the color-identification parameter.

18. The non-transitory machine readable storage medium in claim 15, wherein the image-analysis tool determines an estimated body-mass of the domestic animal, and a body-mass determined by the image-analysis tool is compared to a body-mass identification parameter received as user-input to the graphical user interface to determine the accuracy of the body-mass identification parameter.

19. The non-transitory machine readable storage medium in claim 15, wherein the image-analysis tool determines a two-dimensional (2D) spatial distance between specified features of the domestic animal represented in the image, and the 2D spatial distance is compared to images in the domestic animal profiles to identify a domestic animal that has features which substantially correspond to the 2D spatial distance.

20. The non-transitory machine readable storage medium in claim 18, wherein the image-analysis tool:
displays the image in the graphical user interface to allow a user to indicate a 2D spatial distance between specified features of a domestic animal represented in an image; and
receives the 2D spatial distance input to the graphical user interface to be used to identify a domestic animal that has features which substantially correspond to the 2D spatial distance, wherein a graphical tool enables the user to select areas in the image that represent the specified features of the domestic animal and digitally draw an axis between the specified features.

* * * * *